Patented May 26, 1942

2,284,578

UNITED STATES PATENT OFFICE 2,284,578

VULCANIZABLE RUBBER COMPOSITIONS

Paul C. Jones, Akron, Ohio, assignor to The B. F. Goodrich Company, New York, N. Y., a corporation of New York No Drawing. Application June 30, 1939, Serial No. 282,063

20 Claims. (Cl. 260—788)

This invention relates to the vulcanization of rubber, and to a new method of accelerating said vulcanization.

Although free sulfur is commonly included in rubber compositions in three or more parts by weight per hundred parts of rubber to produce satisfactory cures, the resistance of such vulcanizates to deterioration by heat and oxidation is much less than the resistance of low-sulfur vulcanizates. It has been proposed to vulcanize rubber in the presence of organic vulcanizing agents which liberate nascent sulfur during the cure, but this procedure has not uniformly produced vulcanizates which aged well. Rubber compositions cured with thioamines such as N,N'-dithiodiethylamine and N,N'-tetrathiomorpholine, for instance, age very poorly.

It is the principal object of this invention to provide a method of curing rubber compositions in the absence of added free sulfur. Another object of the invention is to prepare vulcanizates having good resistance to deterioration by heat and oxidation.

I have discovered that the objects of this invention may be realized by vulcanizing rubber in the presence of a thioamine and a compound which is stable at room temperatures but which decomposes at vulcanizing temperatures with the formation of carbon disulfide. It is known that carbon disulfide reacts with thioamines to form accelerating and vulcanizing agents. This reaction may be represented as follows:

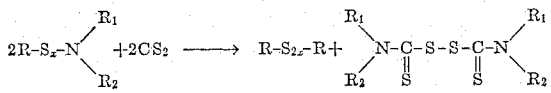

In the above equation, R represents an organic radical with the free valence on carbon or on an amino nitrogen, $R_1$ represents hydrogen or a hydrocarbon group, and $R_2$ represents a hydrocarbon group. R is preferably a dialkylamino group, an alicyclic amino group, a thiazyl group, or a dithiocarbamyl group. $R_1$ and $R_2$ are preferably alkyl groups, or $R_1$ is a hydrogen group and $R_2$ is an alicyclic group, or $R_1$ and $R_2$ are joined by a methylene chain which may be interrupted by oxygen, sulfur, or nitrogen. $R_1$ and $R_2$ may be substituted by hydroxy, alkoxy, halogen, amino, or similar non-acid groups if desired.

Included among the preferred thioamines are N,N'-polythiodialkylamines such as

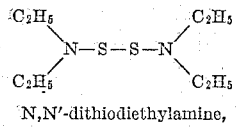

N,N'-dithiodiethylamine,

N,N'-trithiodiethylamine, and equivalent materials such as N,N'-trithiomorpholine, N,N'-tetrathiomorpholine,

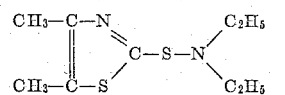

4,5-dimethylthiazyl-2-sulfene-diethylamide, benzothiazyl - 2 - sulfene-diethylamide, 4-ethylthiazyl-2-sulfene - cyclohexylamine, benzothiazyl-2-sulfene - cyclohexylamine, diphenylthiocarbamyl-sulfene-diethylamide, and dimethylthiocarbamyl-sulfene-diethylamide.

Any compound which is stable at room temperatures but which liberates carbon disulfide at vulcanizing temperatures, which approximately comprise the range 200° F.–300° F., may be employed in conjunction with the thioamine. Unsubstituted thiuram polysulfides are preferred materials, for they liberate not only carbon disulfide but also free sulfur upon decomposition, and are therefore particularly useful with the monothioamines. The trithiocarbonates and particularly the alkaline earth trithiocarbonates have also been found to be useful. Barium trithiocarbonate has been found to be very satisfactory because of its low cost, stability at normal temperatures, and the readiness with which it decomposes at vulcanizing temperatures. Other trithiocarbonates such as potassium trithiocarbonate, zinc trithiocarbonate, magnesium trithiocarbonate, dimethyltrithiocarbonate, diethyltrithiocarbonate, etc., may be employed if desired.

As a specific example of this invention, a composition containing rubber 100 parts by weight, zinc oxide 5 parts, stearic acid 1 part, thiuram disulfide 5 parts, and 4,5-dimethylthiazyl-2-sulfene-diethylamide 2 parts was heated in a press for various times at 287° F. Vulcanizates having the following tensile strengths expressed in lbs./in.² and ultimate elongations expressed in per cent were formed:

| Time of cure | T | E |
|---|---|---|
| 30 minutes | 3,050 | 810 |
| 60 minutes | 3,165 | 790 |
| 90 minutes | 3,125 | 800 |
| 120 minutes | 3,175 | 800 |

It will be seen that a well-cured vulcanizate formed in only 30 minutes and that the composition had an extremely flate rate of cure. This vulcanizate had very good resistance to deterioration by heat and oxidation even in the absence of any antioxidant. When placed in a Bierer-David bomb for 96 hours under an oxygen pressure of 300 lbs./in.² at a temperature of 70° C., the composition retained ⅔ of its strength, while vulcanizates to which ordinary amounts of free sulfur are added before cure or which are vulcanized in the presence of N,N'-polythiodialkyl amines alone are destroyed by this severe aging test.

In another example, a composition containing rubber 100 parts, zinc oxide 5 parts, stearic acid 1 part, thiuram disulfide 2 parts and N,N'-dithiodiethylamine 3 parts was heated in a press for 30 min. at 287° F. and produced a vulcanizate having a tensile strength of 3185 lbs./in.² and an elongation of 740%.

When the carbon disulfie liberating agent and thioamine in the above example were replaced by 3 parts of barium trithiocarbonate and 3 parts of 2-mercapto-4,5-dimethylthiazyl diethyl amine, a vulcanizate having a tensile strength of 2245 lbs./in.² and an elongation of 800% was produced.

When 2 parts of N,N'-dithiodiethylamine was used as the thioamine in the preceding example, a vulcanizate having a tensile strength of 2500 lbs./in.² and an elongation of 810% was produced.

Although the invention has been described in detail in connection with specific rubber compositions, it will be evident that this invention is applicable to rubber compositions of the most varied nature, and that all manner of rubber goods including pneumatic and solid rubber tires, tubes, hose, electrical insulation, belting, packing, boots and shoes, surgical rubber goods, seamless dipped rubber articles, etc., may be vulcanized in the presence of the combinations herein described. The materials of this invention may be incorporated in the rubber by mastication, milling or any similar process, or in the case of latex, rubber cement, or any other natural or artificial dispersion or solution of rubber, by simply dissolving or suspending the materials therein.

The vulcanization may be performed in other manners than that particularly set forth in the specific examples; specifically, rubber compositions may be heated in hot air, steam, hot water, etc.

It is to be understood that the term "a rubber" is employed in the appended claims in a generic sense to designate rubbery materials capable of vulcanization when heated with sulfur and includes caoutchouc, balata, gutta percha, latex, rubber isomers, or synthetic rubber whether or not admixed with pigments, fillers, softeners, antioxidants, other accelerators, etc.

While I have herein disclosed specific embodiments of my invention, I do not intend to limit myself solely thereto, for it will be obvious to those skilled in the art that many modifications such as using other materials having equivalent properties and varying the proportions of materials used are within the spirit and scope of the invention as defined in the appended claims.

I claim:

1. The method which comprises heating, in the presence of a N-thioamine and a compound which is stable at room temperatures but which decomposes at vulcanizing temperatures with the formation of carbon disulfide, a rubber composition comprising a rubber to which sulfur has been added only in a combined form.

2. The method which comprises heating, in the presence of a N-thioamine and thiuram disulfide, a rubber composition comprising a rubber to which sulfur has been added only in a combined form.

3. The method which comprises heating, in the presence of a thiazyl-2-sulfene amide and a compound which is stable at room temperatures but which decomposes at vulcanizing temperatures with the formation of carbon disulfide, a rubber composition comprising a rubber to which sulfur has been added only in a combined form.

4. The method which comprises heating, in the presence of a thiazyl-2-sulfane dialkyl amide and thiuram disulfide, a rubber composition comprising a rubber to which sulfur has been added only in a combined form.

5. The method which comprises heating, in the presence of 4,5-dimethylthiazyl-2-sulfene-diethylamide and thiuram disulfide, a rubber composition comprising a rubber to which sulfur has been added only in a combined form.

6. The method which comprises heating, in the presence of a N-thioamine and a metallic trithiocarbonate, a rubber composition comprising a rubber to which sulfur has been added only in a combined form.

7. The method which comprises heating, in the presence of a N,N'-polythiodialkylamine and barium trithiocarbonate, a rubber composition comprising a rubber to which sulfur has been added only in a combined form.

8. The method which comprises heating, in the presence of N,N'-dithiodiethylamine and barium trithiocarbonate, a rubber composition comprising a rubber to which sulfur has been added only in a combined form.

9. The method which comprises heating, in the presence of a N,N'-polythiodialkylamine and a compound which is stable at room temperatures but which decomposes at vulcanizing temperatures with the formation of carbon disulfide, a rubber composition comprising a rubber to which sulfur has been added only in a combined form.

10. The method which comprises heating, in the presence of a thiazyl-2-sulfene amide and barium trithiocarbonate, a rubber composition comprising a rubber to which sulfur has been added only in a combined form.

11. The method which comprises heating, in the presence of 4,5-dimethylthiazyl-2-sulfene-diethylamide and barium trithiocarbonate, a rubber composition comprising a rubber to which sulfur has been added only in a combined form.

12. A vulcanizable rubber composition comprisa rubber containing sulfur only in a combined form, said composition containing a N-thioamine and a compound which is stable at room temperatures but which decomposes at vulcanizing temperatures with the formation of carbon disulfide.

13. A vulcanizable rubber composition comprising a rubber containing sulfur only in a combined form, said composition containing a thiazyl-2-sulfene amide and a compound which is stable at room temperatures but which decomposes at vulcanizing temperatures with the formation of carbon disulfide.

14. A vulcanizable rubber composition comprising a rubber container sulfur only in a combined form, said composition containing a thiazyl-2-sulfene dialkylamide and thiuram disulfide.

15. A vulcanizable rubber composition comprising a rubber containing sulfur only in a combined form, said composition containing a 4,5-dimethylthiazyl - 2 - sulfene - diethylamide and thiuram disulfide.

16. A vulcanizable rubber composition comprising a rubber containing sulfur only in a combined form, said composition containing 4,5-dimethylthiazyl-2-sulfene diethylamide and barium trithiocarbonuate.

17. A vulcanizable rubber composition comprising a rubber containing sulfur only in a combined form, said composition containing a N,N'-polythiodialkylamine and a combined which is stable at room temperatures but which decomposes at vulcanizing temperatures with the formation of carbon disulfide.

18. A vulcanizable rubber composition comprising a rubber containing sulfur only in a combined form, said composition containing N,N'-dithiodiethylamine and barium trithiocarbonate.

19. A vulcanized rubber composition comprising a rubber to which sulfur has been added in only a combined form prior to vulcanization, which composition has been vulcanized in the presence of a N-thioamine and a compound which is stable at room temperatures but which decomposes at vulcanizing temperatures with the formation of carbon disulfide.

20. A vulcanized rubber composition comprising a rubber to which sulfur has been added in only a combined form prior to vulcanzation, which composition has been vulcanized in the presence of a N-thioamine and thiuram disulfide.

PAUL C. JONES.

CERTIFICATE OF CORRECTION.

Patent No. 2,284,578.

May 26, 1942.

PAUL C. JONES.

It is hereby certified that error appears in the printed specification of the above numbered patent requiring correction as follows: Page 2, first column, line 12, for "flate" read --flat--; line 31, for "disulfie" read --disulfide--; and second column, line 27, claim 4, for "thiazyl-2-sulfane" read --thiazyl-2-sulfene--; page 3, first column, line 8, claim 14, for "container" read --containing--; line 21, claim 16, for "trithiocarbonuate" read --trithiocarbonate--; and second column, line 2, claim 17, for "combined" read --compound--; line 16, claim 19, after the syllable "forma" insert a hyphen; and that the said Letters Patent should be read with this correction therein that the same may conform to the record of the case in the Patent Office.

Signed and sealed this 1st day of September, A. D. 1942.

Henry Van Arsdale,
Acting Commissioner of Patents.

(Seal)